United States Patent [19]

Fox et al.

[11] Patent Number: 4,747,299

[45] Date of Patent: May 31, 1988

[54] METHOD OF TESTING A PACKAGE SEAL

[75] Inventors: John M. Fox, Blasdell; David C. Maloney, Alden, both of N.Y.

[73] Assignee: The Aro Corporation, Bryan, Ohio

[21] Appl. No.: 114,157

[22] Filed: Oct. 28, 1987

[51] Int. Cl.$^4$ .............................................. G01M 3/36
[52] U.S. Cl. ........................................ 73/49.3; 73/52
[58] Field of Search ............................ 73/40, 49.3, 52

[56] References Cited

U.S. PATENT DOCUMENTS

| 3,751,972 | 8/1973 | Hass | 73/45.4 |
| 3,837,215 | 9/1974 | Massage | 73/49.3 |
| 4,188,919 | 2/1980 | Egee et al. | 73/49.3 |
| 4,326,408 | 4/1982 | Kanoh | 73/49.3 |
| 4,663,964 | 5/1978 | Croce | 73/49.3 |
| 4,715,215 | 12/1978 | Perhach et al. | 73/49.3 |

FOREIGN PATENT DOCUMENTS

| 181722 | 5/1986 | European Pat. Off. | 73/49.3 |
| 2351400 | 5/1966 | France | 73/49.3 |
| 44637 | 3/1984 | Japan | 73/49.3 |
| 2059381 | 4/1981 | United Kingdom | 73/49.3 |

Primary Examiner—Stewart J. Levy
Assistant Examiner—Hezron E. Williams
Attorney, Agent, or Firm—Sommer & Sommer

[57] ABSTRACT

A method of testing the integrity of a package seal (14) provided between a container portion (11) and a lid portion (12), includes the steps of: initially reducing the pressure acting on the outer surface of the container portion to cause the lid portion to bow inwardly to a position of substantially maximum concavity while maintaining the ullage volume within the package substantially constant; further reducing the pressure acting on the outer surface of the container portion to distend the container portion for increasing the volume of the ullage space; and sensing for a change in position of the distended container wall.

4 Claims, 1 Drawing Sheet

METHOD OF TESTING A PACKAGE SEAL

TECHNICAL FIELD

This invention relates generally to a method for testing the integrity of a hermetically-sealed flexible-walled package.

BACKGROUND ART

Flexible-wall packages are ubiquitous in today's world. In addition to commonly being disposable, these packages offer a virtually-endless variety of shapes, sizes and configurations. Such packages or pouches are commonly used to store food items. To verify the projected shelf-life of the product, a need has arisen to test non-destructively the integrity of the seal.

Others have attempted to address this problem. Some of these earlier solutions have contemplated that the package-to-be-tested be placed within an enclosure. The enclosure is then evacuated to create a pressure differential such that air or gas will tend to escape from the package. A sensor is used to monitor movement of a movable wall portion of the package, and, in turn, indicates whether leakage has occurred. Examples of such prior art devices are shown and described in U.S. patent application Ser. No. 914,239, filed Oct. 2, 1986; in U.S. Pat. Nos. 3,751,972, 3,837,215, 4,517,827, 3,918,295 and 3,117,441; published in British patent application No. 2,059,381A; and in published French patent application No. 2,351,400.

DISCLOSURE OF THE INVENTION

The present invention provides an improved method for testing the integrity of a seal in a package. The package has a thin-walled open-mouthed container portion, and has a flexible lid portion sealed peripherally to the rim of the container mouth. The package may have an ullage or head space volume therewithin, which volume may be occupied by a gas.

The improved method comprises the steps of: creating a first pressure differential across the lid portion to bow the lid portion into the container portion to a position of substantially-maximum concavity without substantially changing the ullage volume; creating a second pressure differential across the wall of the container portion to increase the ullage volume; and sensing for a change in position of the container portion wall after the second pressure differential has been created; thereby to indicate whether fluid has leaked into the package.

In the preferred embodiment, the first and second pressure differentials are created by selectively reducing the pressure acting on the outer surface of the container portion wall. If desired, a positive pressure may be exerted on the lid portion outer surface.

Accordingly, the principal object of the present invention is to provide an improved method for testing the integrity of a seal in a package.

Another object is to provide an improved method for testing hermetically-sealed packages which may be subjected to long-term on-the-shelf storage.

These and other objects and advantages will become apparent from the foregoing and ongoing written specification, the drawings, and the appended claims.

MODE(S) FOR CARRYING OUT THE INVENTION

Figure 1:
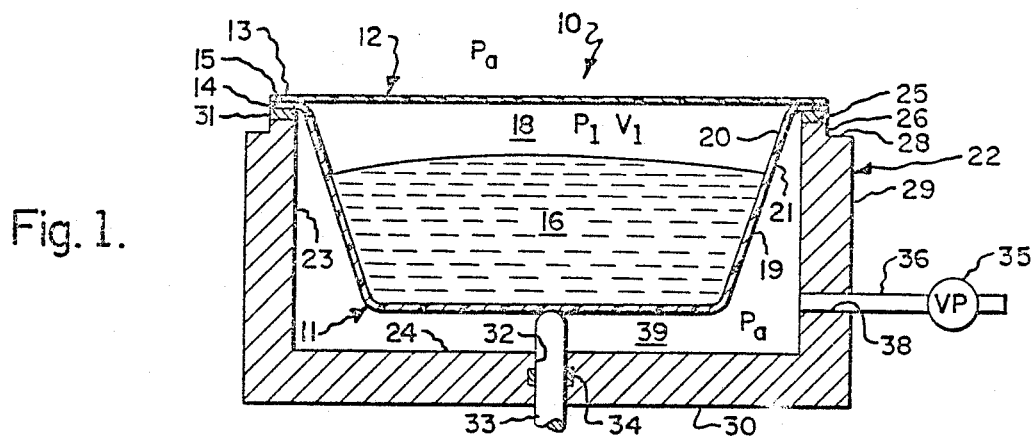
FIG. 1 is a schematic vertical sectional view of a package-to-be-tested resting in a test fixture.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to read (e.g., cross-hatching, arrangement of parts, etc.) together with the specification, and are to be considered a portion of the entire "written description" of this invention, as required by 35 U.S.C.§112. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Referring now to the drawings, this invention broadly provides an improved apparatus for, and an improved method of, testing the sealed integrity of a hermetically-sealed flexible-wall package. Such packages abound today in a variety of different forms and shapes, and typically contain perishable food products and the like.

In FIG. 1, a package, generally indicated at 10 is shown as having a cup-shaped container portion 11, and a lid portion 12. The outer margin 13 of the lid portion is peripherally bonded or otherwise sealed to the upper surface of the out-turned rim 14 of the container portion, by means of an intermediate annular seal 15. The package is shown as containing a suitable object (such as a mass of a food product 16), which does not fill the entire volume of the thus-formed package, and the ullage or head space within the package is indicated at 18. However, it should be noted that it is not necessary that a package-to-be-tested contain such head space.

It should also be understood that the disclosed package is merely intended to be representative of a large number of packages which may be tested according to the principles of the invention. Thus, as used herein, the terms "package" is not limited to the particular size, shape or configuration of that disclosed. In any event, the container portion has a cup-shaped thin flexible wall 19, typically formed of a suitable plastic material, and is provided with an inner surface 20 and an outer surface 21. The wall of the container portion is typically formed with a plurality of flutes (not shown) for the purpose of imparting strength to the container portion wall. Because the container material is thus "gathered", it may deform outwardly in response to a pressure differential thereacross. The lid portion 12 is used to close the open mouth of the container, and is typically formed of a relatively more-flexible film or foil. The particular type and nature of the seal (i.e., whether a heat seal, an adhesive seal, or whatever) is not deemed critical to the operation of the improved method.

With the package and its contents at ambient temperature, the ullage space 18 has a volume $V_1$ and is at a pressure $P_1$. This pressure may be greater than, equal to, or less than atmospheric pressure $P_a$. However, for purposes of illustration, it is initially assumed that the ullage space is substantially at atmospheric pressure (i.e., $P_1 = P_a$).

The test fixture, generally indicated at 22, is shown as being in the form of an open-mouthed cup-shaped receiver member. More particularly, fixture 22 has an inside surface which includes an inwardly-facing vertical cylindrical surface 23, and an upwardly-facing horizontal annular surface 24. The fixture has an outside surface which sequentially includes: an upwardly-facing annular horizontal surface 25 extending radially outwardly from the upper margin of inside surface 23, an outwardly-facing cylindrical vertical surface 26 depending therefrom, an upwardly-facing annular horizontal surface 28, an outwardly-facing vertical cylindrical surface 29, and a downwardly-facing horizontal annular bottom surface 30. An annular seal ring 31, formed of a suitable resilient material, is secured to fixture upper surface 25, and provides an effective airtight seal between the rim of the container portion and the fixture, when the fixture chamber is subsequently evacuated. The fixture also has an axial vertical through-hole 32 in which the plunger 33 of a position sensor (not shown) is slidably mounted. The joint between the plunger and fixture hole is schematically shown as being sealed by means of an O-ring 34. The plunger is biased to move upwardly so that its nose will continuously engage the bottom of the cup-shaped member. Thus, the position of this portion of the container is sensed, and converted into a suitable analogous electrical signal.

A vacuum pump 35 communicates via a conduit 36 and hole 38 with the interior of the fixture, and may be selectively operated to reduce the pressure in the chamber 39 between the fixture inner surface and the package-to-be-tested.

OPERATION

Figure 2:
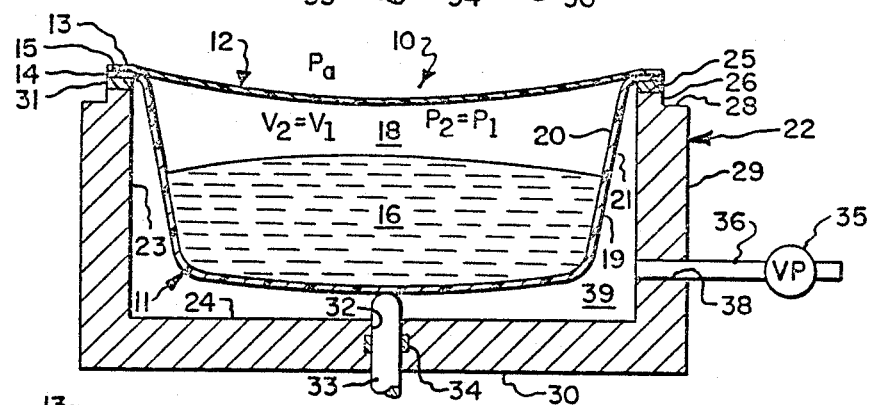
FIG. 2 is a schematic view similar to FIG. 1, and depicts the package lid portion as having bowed inwardly of the container portion when the pressure acting on the outside wall of the container portion has been initially reduced.
Figure 3:
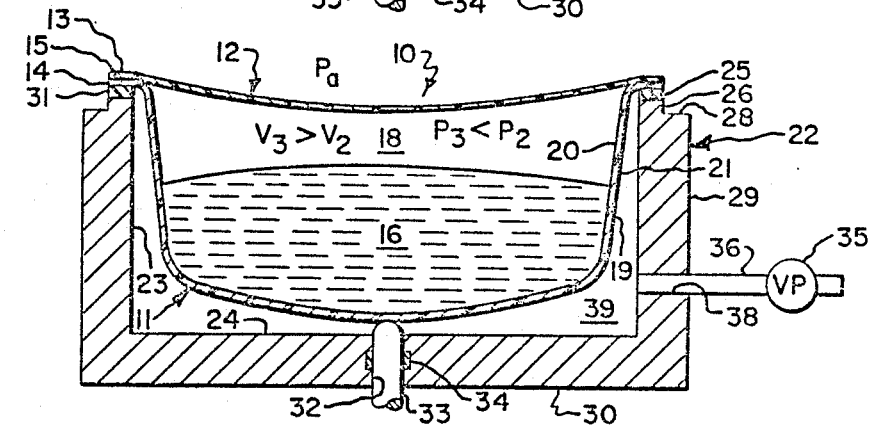
FIG. 3 is a schematic view similar to FIG. 2, and shows the container wall as having been distorted further outwardly when the pressure acting on the outside wall of the container has been further reduced.

The operational sequence of the improved method is sequentially shown in FIGS. 1–3.

A package-to-be-tested is first placed in the fixture, as shown in FIG. 1, so that the underside of the container rim 14 will rest on the upper surface of ring seal 31. As noted above, the nose of the plunger will continuously engage the bottom of the package during the test sequence, and the associated sensor (not shown) is operatively arranged to continuously provide a suitable analog electrical signal reflective of such sensed position. It is initially assumed that chamber 39 is at atmospheric pressure (i.e., $P_1 = P_a$). Thus, when the package is initially placed in the fixture, atmospheric pressure will act on the entire outer surface of the package. Such outer pressure will cause the ullage pressure to also be substantially at atmospheric pressure, in order for a force-balance to obtain.

Thereafter, the vacuum pump is selectively operated to reduce the pressure in chamber 39, as shown in FIG. 2. As the pressure in chamber 39 begins to fall, the container portion wall begins to bulge outwardly. The ullage pressure remains substantially the same (i.e., $P_2 = P_1$) as the lid portion begins to bow inwardly and the ullage volume remains substantially unchanged (i.e., $V_2 = V_1$). FIG. 2 represents a situation at which the lid portion has bowed inwardly of the container portion to its substantially maximum concave position, while the ullage pressure remains substantially at atmospheric pressure. Thus, in FIG. 2, the ullage volume and pressure are substantially the same as that shown in FIG. 1, albeit the lid portion has bowed inwardly.

Thereafter, the vacuum pump is operated so as to further reduce the pressure in chamber 39. Since the lid portion has already bowed to its extent of maximum concavity, such further reduction of the pressure in chamber 39 will not cause the lid portion to bow further inwardly. However, when the pressure in chamber 39 is further reduced, a pressure differential will be created across the container portion wall (i.e., $P_3 < P_2$), which urges such wall to bulge further outwardly. This increases the volume of the ullage space (i.e., $V_3 > V_2$), and, concomitantly, reduces the ullage pressure to a sub-atmospheric value. Thus, a pressure differential will now exist across the lid portion and the radial dimension of the seal. If the container is properly sealed, the plunger will remain in its distended position if the vacuum in chamber 39 is held for a period of time. On the other hand, if either the lid or the seal has a leak, air will flow into the ullage space, and the distended container portion bottom will move further downwardly. This is sensed by the movement of the plunger, and is used to indicate whether the package is sealed or not.

Figure 4:
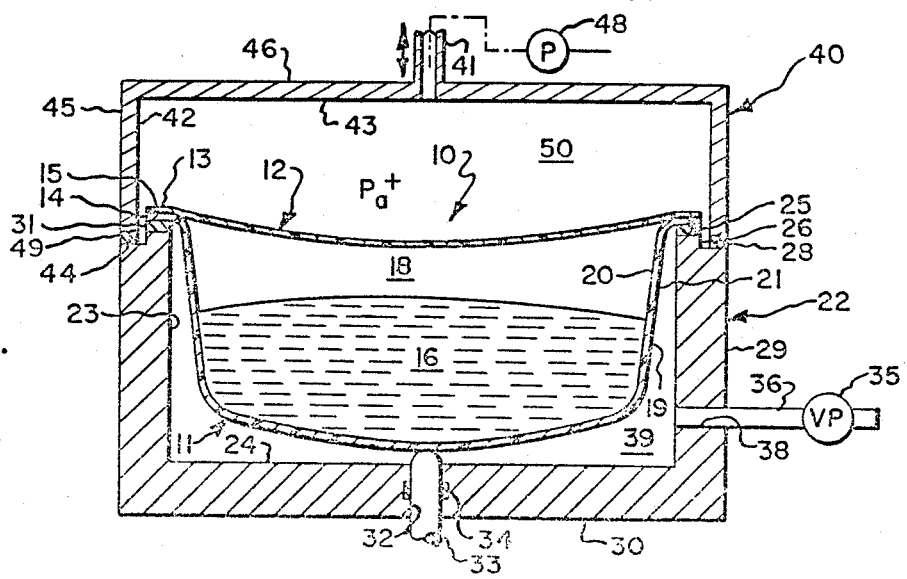
FIG. 4 is a schematic view generally similar to FIG. 3, and shows an optional pressurizing chamber for selectively applying a greater-than-atmospheric pressure to the outer surface of the lid portion and the seal.

Modification (FIG. 4)

FIG. 4 illustrates an optional pressurizing chamber member, generally indicated at 40, which may be selectively lowered into sealed engagement with the fixture, and used to apply other-than atmospheric pressures to the seal and lid portion. Member 40 is shown as being an inverted cup-shaped member mounted on an actuator rod 41, by which the pressurizing chamber may be selectively raised and lowered (as indicated by the bidirectional arrow) relative to the fixture.

The pressurizing chamber has an inner surface which includes an inwardly-facing vertical cylindrical surface 42, and a downwardly-facing annular horizontal surface 43. The outer surface of the pressurizing chamber sequentially includes: a downwardly-facing annular horizontal surface 44 extending radially outwardly from the lower margin of inner surface 42, an outwardlyfacing vertical cylindrical surface 45 rising upwardly therefrom, and an upwardly-facing annular horizontal surface 46. The actuating rod 41 is in the form of a hollow tube and communicates with a suitable pressurizing pump 48. An annular seal ring 49 is mounted on pressurizing chamber lower surface 44, and is arranged to sealingly engage fixture surface 28.

Thus, the pressurizing chamber may be selectively lowered to engage the fixture. Thereafter, pump 48 may be selectively operated to provide a pressure to pressurize chamber 50 formed between the inner surface of the pressurizing chamber and the package, so as to increase the pressure differential across the lid portion and seal.

The present invention contemplates that many other modifications and changes may be made. For example, the invention may be used with a myriad of different types and styles of packages. The fixture need not be of the specific form disclosed, but may have other shapes as well. Similarly, the pressurizing chamber is entirely optional.

Therefore, while a preferred form of practicing the improved method has been illustrated and described, and several modifications thereof discussed, persons skilled in the art will readily appreciate that various additional changes and modifications may be made without departing from the spirit of the invention, as defined and differentiated by the following claims.

We claim:

1. The method of testing the integrity of a seal in a package, said package having a thin-walled open-mouthed container portion and having a flexible lid portion sealed to a rim portion of said container mouth, said package having an ullage volume therewithin, which method comprises the steps of:

creating a first pressure differential to bow said lid portion into said container portion to a position of substantially maximum concavity without substantially changing said ullage volume;

creating a second pressure differential across the wall of said container portion to increase said ullage volume; and sensing for a change in position of a portion of said container portion wall after said second pressure differential has been created;

thereby to indicate whether fluid has leaked into said package.

2. The method as set forth in claim 1 wherein said first pressure differential is created by reducing the pressure acting on the outside surface of said container portion.

3. The method as set forth in claim 1 wherein said first pressure differential is created, at least in part, by increasing the pressure acting on the outer surface of said lid portion.

4. The method as set forth in claim 1 wherein said first pressure differential is created by reducing the pressure acting on the outside surface of said container portion and by increasing the pressure acting on the outer surface of said lid portion.

* * * * *